(12) United States Patent
Ackley

(10) Patent No.: US 6,367,699 B2
(45) Date of Patent: *Apr. 9, 2002

(54) METHOD AND APPARATUS FOR UTILIZING SPECULAR LIGHT TO IMAGE LOW CONTRAST SYMBOLS

(75) Inventor: H. Sprague Ackley, Seattle, WA (US)

(73) Assignee: Intermec IP Corp., Woodland Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,758

(22) Filed: Sep. 17, 1998

Related U.S. Application Data

(63) Continuation-in-part of application No. 08/680,239, filed on Jul. 11, 1996, now Pat. No. 5,811,777.

(51) Int. Cl.$^7$ ................................................. G06K 7/10
(52) U.S. Cl. ............................ 235/462.49; 235/462.42; 235/462.45
(58) Field of Search ....................... 235/462.45, 462.49, 235/462.25, 462.29, 462.42

(56) References Cited

U.S. PATENT DOCUMENTS

| | | |
|---|---|---|
| 3,169,186 A | 2/1965 | Howard |
| 4,408,120 A | 10/1983 | Hara et al. |
| 4,831,275 A | 5/1989 | Drucker |
| 4,845,349 A | 7/1989 | Cherry |
| 5,140,146 A | 8/1992 | Metlitsky et al. |
| 5,247,162 A | 9/1993 | Swartz et al. |
| 5,393,967 A | 2/1995 | Rice et al. |
| 5,401,944 A | 3/1995 | Bravman et al. |
| 5,449,892 A | 9/1995 | Yamada |
| 5,468,946 A | 11/1995 | Oliver |
| 5,637,854 A * | 6/1997 | Thomas ...................... 235/462 |
| 5,811,777 A * | 9/1998 | Ackley ....................... 235/462 |

* cited by examiner

*Primary Examiner*—Karl D. Frech
(74) *Attorney, Agent, or Firm*—O'Melveny & Myers LLP

(57) ABSTRACT

An apparatus and method for imaging low contrast one and two-dimensional symbols are provided. A light source directs light onto a target that includes a low contrast symbol. An imaging element receives light reflected off of the target and creates an image of the target therefrom. A light level detector determines the intensity level of the light received by the imaging element, and when the intensity level exceeds a predetermined threshold, a controller causes the image data created by the imaging element to be stored in a data memory. In an embodiment of the invention, a light wand is provided with the light source and imaging element. The light wand is adapted to read low contrast bar code symbols disposed on a substrate material using specular light reflected from the bar code symbols by maintaining the light wand at an optimum angle with respect to the substrate material. A alignment tip may further be utilized with the light wand to ensure that the light wand is maintained at the optimum angle.

16 Claims, 5 Drawing Sheets

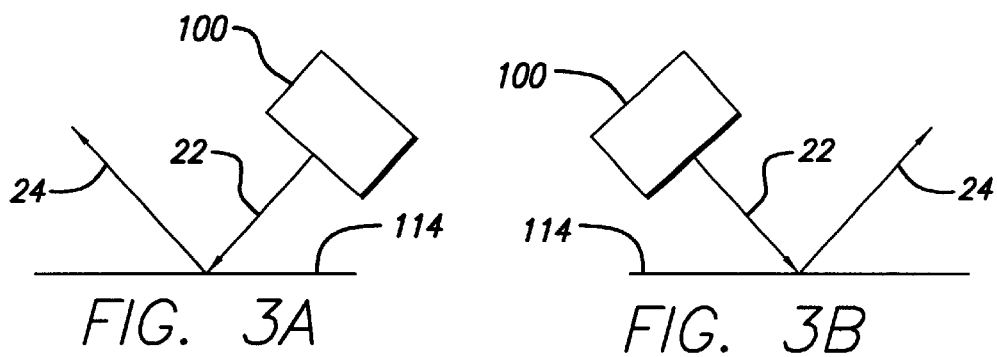
FIG. 3A  FIG. 3B
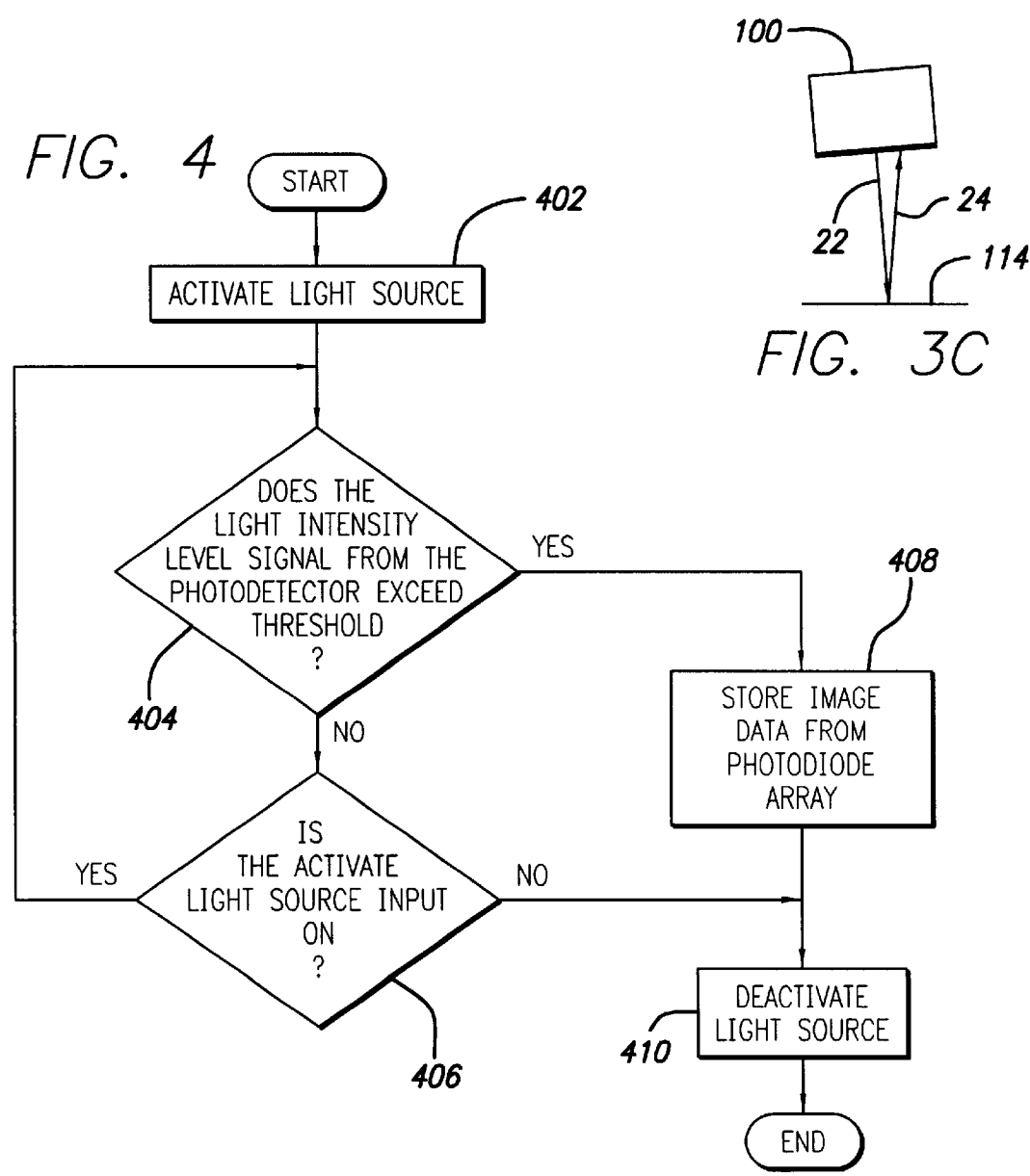
FIG. 3C
FIG. 4

METHOD AND APPARATUS FOR UTILIZING SPECULAR LIGHT TO IMAGE LOW CONTRAST SYMBOLS

RELATED APPLICATION DATA

This application is a continuation-in-part of application Ser. No. 08/680,239, filed Jul. 11, 1996, and now issued as U.S. Pat. No. 5,811,777 on Sep. 22, 1998.

BACKGROUND OF THE INVENTION

1. Field of the Invention

The present invention relates to electro-optical scanners for reading a one or two-dimensional bar code symbology, and more particularly, to a hand held scanner capable of specular imaging in very low contrast symbology environments.

2. Description of Related Art

Optical imaging systems are commonly used to decipher data symbols printed on objects in order to identify the objects or to capture information relating to the object. A bar code symbol represents a common one-dimensional form of symbology, and comprises a pattern of vertical bars of various widths separated by spaces of various widths. Because the bar and space elements have different light reflecting characteristics, a reader can convert the symbology into an electrical signal by analyzing the light reflected from the symbol. The electrical signal can then be decoded to provide an alphanumeric representation of the symbol which identifies the object. Bar code symbols of this nature are now in common usage in various applications, such as inventory control, point of sale identification, or logistical tracking systems.

Since the conventional one-dimensional symbology requires a relatively large amount of space to convey a correspondingly small amount of data, so-called two-dimensional bar code symbologies have been developed. A two-dimensional symbology may comprise a matrix that occupies a uniform amount of space having a generally rectangular or square shape. Instead of bars and spaces, round or square marks disposed at particular rows and columns of the matrix correspond to the information being conveyed. As a result, a two-dimensional matrix symbology can compress significantly more data into a given volume of space than a conventional one-dimensional bar code.

As known in the art, the two-dimensional symbols are read by scanners that convert the symbols into pixel information, such as described in U.S. Pat. No. 4,988,852 issued to Krishnan. The pixel information is in turn deciphered into the alphanumeric information represented by the symbol. Such scanners often utilize charge-coupled device (CCD) technology to convert optical information from the symbol into an electrical signal representation of the matrix. A light source illuminates the symbol, and diffuse light reflected off the symbol is focused onto the surface of the CCD device. The two-dimensional scanners may be provided in a portable device so that they can be brought into close proximity with the item on which the symbol is placed, such as disclosed in U.S. Pat. No. 5,378,883 issued to Batterman et al. The scanner may also be provided in a fixed-position device that images items as they pass by, such as on a production line.

In one particular application of a two-dimensional symbology, a small symbol can be placed directly onto items having low surface area, such as electronic components. The two-dimensional symbol could be formed directly onto the ceramic or plastic package of the electronic components by laser etching or other precision machining process. Since a two-dimensional symbology can compress fifty or more characters of data within a relatively small dimensional space, the symbol can store a unique identifier code for the component, including such information as serial number, lot number, batch number, model number, and/or customer code. The symbols can be used to automate the manufacturing or testing processes, and may also enable manufacturers to protect against component theft or forgery.

Another application of two-dimensional symbology is in the marking of silicon wafers used in manufacturing integrated circuits. As known in the art, a lithographic process is used to form onto a silicon substrate the detailed features associated with individual components that collectively comprise an integrated circuit. In the lithographic process, a desired circuit layout is projected onto the substrate through a mask or reticle. The substrate is coated with a resist material that is sensitive to the particular wavelengths of light that pass to the substrate through transparent regions of the mask. The resist material undergoes a chemical transformation at the portions exposed to light, permitting selective removal of the resist material leaving an image of the circuit layout printed on the substrate. Using the same lithographic process, a two-dimensional symbol can be printed directly onto the substrate. Ideally, the two-dimensional symbol would be disposed in an unused region of the wafer or close to an edge of the wafer.

A significant drawback of such etched, printed or machined symbols is that they have very low contrast and, as a result, are difficult to image. Since the symbol characters are formed by shallow cuts into the surface of a component or substrate, there is little color difference between the characters and the remaining uncut surface area. Also, electronic components often have a dull black finish that tends to further obscure the symbol characters. The characters can only be distinguished by the slight difference in shade due to shadows which form in the etched regions. Another factor to consider in the imaging of such low contrast symbols onto silicon wafers is the delicate nature of the wafers and the undesirability of having a portion of the scanner come into physical contact with the substrate surface of the wafers.

U.S. Pat. No. 5,393,967 issued to Rice et al. discloses a system for reading symbols encoded as a low contrast relief pattern. The disclosed system sweeps or scans a line of light across the relief pattern at a first angle and views light reflected off of the relief pattern at a second angle. The system disclosed in the Rice patent necessarily utilizes relatively complex mechanical and optical systems, which presents a drawback to the system.

Accordingly, a need exists for a method and apparatus for making images of low contrast symbols. Such a method and apparatus would be highly desirable in the manufacture of electronic components and silicon wafers.

SUMMARY OF THE INVENTION

In accordance with the teachings of the present invention, an apparatus and method that permits specular imaging of low contrast symbols is provided.

Particularly, the imaging device of the present invention includes a light source for directing light onto a target that includes a low contrast symbol. An imaging element receives specular light reflected off of the target and creates an image of the target therefrom that is stored in a data memory. A light level detector may also be used to determine the intensity level of the light received by the imaging element, and when the intensity level exceeds a predetermined threshold, a controller causes the image data created by the imaging element to be stored in the data memory.

In an embodiment of the invention, a light wand is provided with the light source and imaging element. The light wand is adapted to read low contrast bar code symbols disposed on a substrate material using specular light reflected from the bar code symbols by maintaining the light wand at an optimum angle with respect to the substrate material. An alignment tip may further be utilized with the light wand to ensure that the light wand is maintained at the optimum angle. The alignment tip includes a notched portion adapted to engage an edge of the substrate material so as to train an operator to maintain the optimum angle for specular light imaging.

A more complete understanding of the present invention will be afforded to those skilled in the art, as well as a realization of additional advantages and objects thereof, by the following detailed description of the preferred embodiment. Reference will be made to the appended sheets of drawings which will first be described briefly.

BRIEF DESCRIPTION OF THE DRAWINGS

FIGS. 3A–3C illustrate positioning of the imaging system of FIG. 2 so as to receive reflected specular light;

FIG. 4 illustrates an exemplary process for controlling operation of the embodiment illustrated in FIG. 2;

DETAILED DESCRIPTION OF THE PREFERRED EMBODIMENT

The present invention satisfies the need for a method and apparatus for making images of low contrast symbols, by utilizing specular light that has reflected off of a symbol to create an image of the symbol. In the detailed description that follows, like element numerals are used to describe like elements that are illustrated in one or more of the figures.

Figure 1:
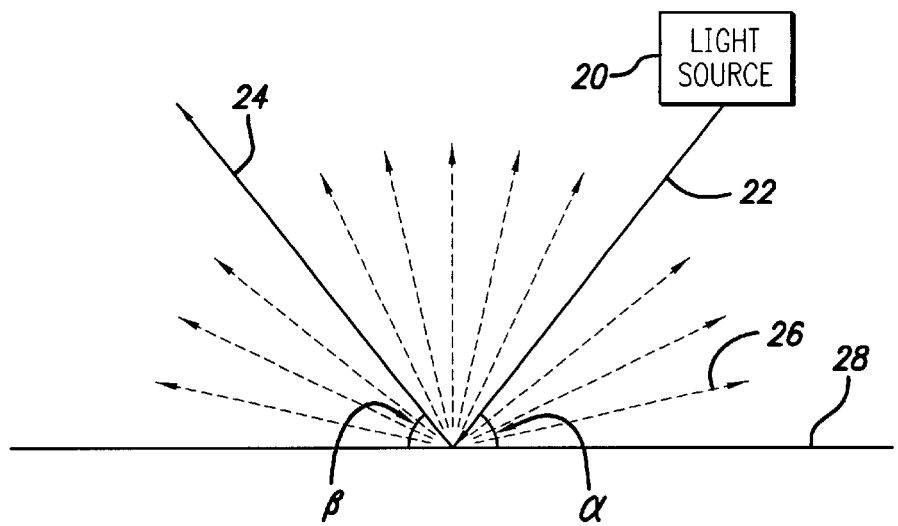
FIG. 1 illustrates specular and diffuse light reflected off of a surface.

As illustrated in FIG. 1, two types of light are produced when light 22 reflects off of a surface 28: a) specular light 24; and b) diffuse light 26. Specular light 24 is that portion of the original light 22 that reflects directly off of the surface 28. Diffuse light 26, on the other hand, is that portion of the original light 22 which is scattered when the original light 22 hits the surface 28. As also illustrated in FIG. 1, specular light 24 is concentrated along a path having an angle of reflection q that is approximately equal to the angle of incidence I of the original light 22, while diffuse light 26 is scattered in all directions away from the point of reflection of the original light 22. Because most of the original light 22 is reflected directly off of the surface 28, specular light 24 is far more intense than diffuse light.

Prior art imaging systems use only diffuse light to create an image of a target 28. This is because an imaging system need not be precisely positioned to received diffuse light, and diffuse light is sufficiently intense to illuminate the color and shading distinctions in a typical printed bar code. Because specular light is far more intense than diffuse light and would overpower, or "blind," a system designed to receive diffuse light, prior art systems typically include a filter to remove any specular light from the light that is reflected onto the imaging system. Such systems also typically include a gain control circuit to boost the level of electrical signals produced from the diffuse light to obtain an image.

In contrast to prior art imaging systems, the present invention utilizes specular light 24 to create an image of a low contrast symbol, such as an etched, printed or machined bar code symbol. Specular light 24 is utilized because it is significantly more intense than diffuse light, and is therefore able to illuminate the subtle color or shading or surface texture distinctions between characters in a low contrast bar code symbol. As described above, the characters in a low contrast bar code symbol can be distinguished only by the slight difference in shade due to shadows which form in the more deeply etched regions of the symbol. Diffuse light usually cannot be utilized because it is not sufficiently intense to illuminate such subtle color or shading distinctions.

Figure 2:
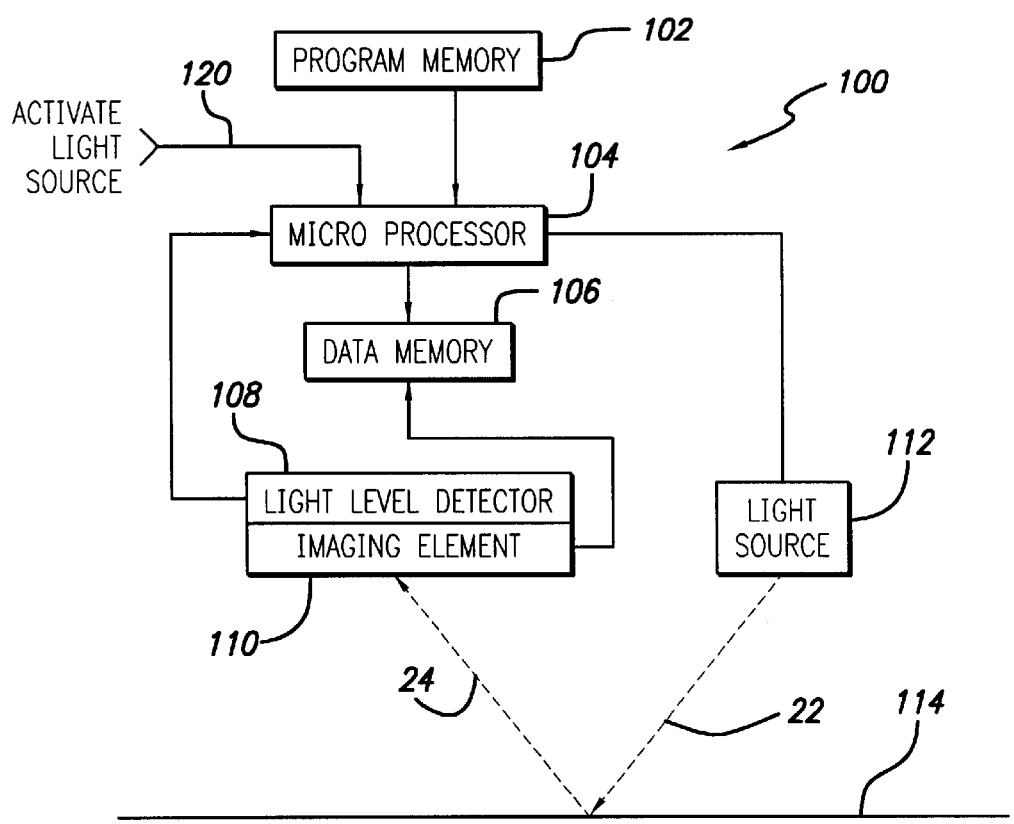
FIG. 2 illustrates an exemplary embodiment of an imaging system of the present invention.

Referring next to FIG. 2, an exemplary embodiment of an imaging system 100 that includes the teachings of the present invention is illustrated. The system 100 includes a program memory 102, a microprocessor 104, a data memory 106, an imaging element 110, a light level detector 108, and a light source 112. The system 100 may also include a gain control (not shown) for controlling the output level of signals produced by the imaging element 110. The entire imaging system 100 may be contained within a single unit. Alternatively, the elements may be distributed so that a simple, lightweight unit is used to create image data and transmit the data to a central unit for further processing. The image data may then be transmitted to an attached computer, stored locally for later transfer or forwarded to an application program resident within the imaging system itself.

The microprocessor 104 controls one or more operations of the imaging system 100 in accordance with instruction sets, e.g., software or firmware, stored in the program memory 102. As will be explained in more detail below, the microprocessor 104 controls activation of the light source 112 and the storing of data in the data memory 106. The microprocessor 104 may also perform other operations, such as decoding image data stored in the data memory 106, transferring the image data to other systems, etc.

Any conventional microprocessor may be used with the present invention, such as the TI-C30 processor available from Texas Instruments, Inc. The program memory 102 is preferably a semiconductor-based read only memory (ROM) device because such devices are non-volatile and permit the stored instructions to remain in storage within the devices even after electrical power is removed. It should be apparent that the functions performed by the stored instruction set may also be accomplished by traditional hard wired circuits, but software or firmware systems are preferred due to their relative simplicity, adaptability to change, and low cost. It should also be apparent that the ROM devices may further be erasable or programmable, so that modifications or revisions to the software can be implemented as desired. Moreover, other permanent storage media can be utilized as program memory 102, such as magnetic or optical disks.

A light source 112 activated under the control of the microprocessor 104 is used to generate light 22. When the system 100 is positioned in proximity to a target 114, the generated light 22 illuminates the target 114. The light source can comprise any well known mechanism for generating light such as an incandescent light source, a light emitting diode (LED), laser diode, etc. Light reflects off of the target 114 and onto an imaging element 110. The imaging element 110 converts the received light 24 into a plurality of electrical signals that correspond to the intensity of the received light. The plurality of electrical signals are then amplified and converted into digitized data, which represent an image of the target 114.

The imaging element 110 may comprise a charge coupled device (CCD). Typically, a CCD comprises a one-dimensional or two-dimensional array of adjacent photodiodes with each photodiode defining a distinct picture element (i.e., pixel) of the array. It should be noted that the array of the CCD imaging element is not limited to any particular pattern. For example, the array can be arranged in the usual order of linear rows and columns; the array can be arranged in a diamond pattern in which the rows are linear and the columns are offset in a regular fashion; or, the array can be arranged in any other pattern in which the photodiodes are ordered relative to each other. Each photodiode of the CCD array generates a voltage and/or current that represents the intensity of the light reflected onto the particular photodiode. The CCD array is scanned electronically by activating the individual photodiodes in a sequential manner in order to produce an output signal containing the voltage and/or current levels from each photodiode. The detected voltage and/or current levels are then amplified and converted to binary data values.

After the imaging element 110 converts the received light 24 into binary data values representing an image of the target 114, the binary data values are transmitted to a data memory 106, which may comprise a conventional semiconductor-based random access memory (RAM). Upon receiving a "write" signal from the microprocessor 104, the transmitted binary data values are stored in the data memory 106. The imaging element 110 further includes a light level detector 108 for detecting the intensity level of the light 24 reflected onto the imaging element. The light level detector 108 preferably provides a digitized output to the microprocessor 104 indicating the instantaneous intensity level of the light 24 reflected onto the imaging element 110. Such light level detectors are well known in the art, and any suitable detector can be used with the present invention.

As shown in FIGS. 3A–3C, reflected specular light 24 from the light source 112 is received by the imaging element 110 only if the imaging system 100 is precisely positioned with respect to the target 114. The light level detector 108 allows the system 100 to automatically determine when the system is positioned such that specular light—as opposed to only diffuse light—is reflected onto the imaging element 110. As will be explained in more detail below, the microprocessor 104 is programmed to cause image data produced by the imaging element 110 to be stored in the data memory 106 only when the intensity of the light reflected onto the imaging element is comparable to that of specular light.

An exemplary program for controlling operation of the system 100 illustrated in FIG. 2 will now be described with reference to FIG. 4. In response to an activate light source signal 120, the microprocessor executes the process shown in FIG. 4. Initially, the light source 112 is activated at step 402. Digitized data from the light level detector 108 representing the intensity level of light 24 reflected onto the imaging element 110 is then compared to a predetermined threshold value at step 404. The predetermined threshold corresponds approximately to the intensity level of specular light reflected off of the target 114. If it is determined at step 404 that the digitized light intensity level signal from the light level detector 108 does not exceed the predetermined threshold, processing proceeds to step 406, where it is determined whether the activate light source signal 120 is still activated. If so, steps 404 and 406 are continuously repeated until either the digitized light intensity level signal from the light level detector 108 exceeds the predetermined threshold or the activate light source signal 120 is no longer active.

If it is determined at step 404 that the digitized light intensity level signal from the light level detector 108 exceeds the predetermined threshold indicating that specular light is being reflected onto the imaging element 110, processing proceeds to step 408, where the microprocessor outputs a "write" signal to the data memory 106, storing the image data produced by the imaging element 110. A signal, such as an audible beep, indicating the successful completion of the storing operation may be created in conjunction with step 408. The light source is then deactivated at step 410 and processing ends. If it is determined at step 406 that the activate light source signal 120 is no longer active, processing proceeds directly to step 410.

Figure 5:
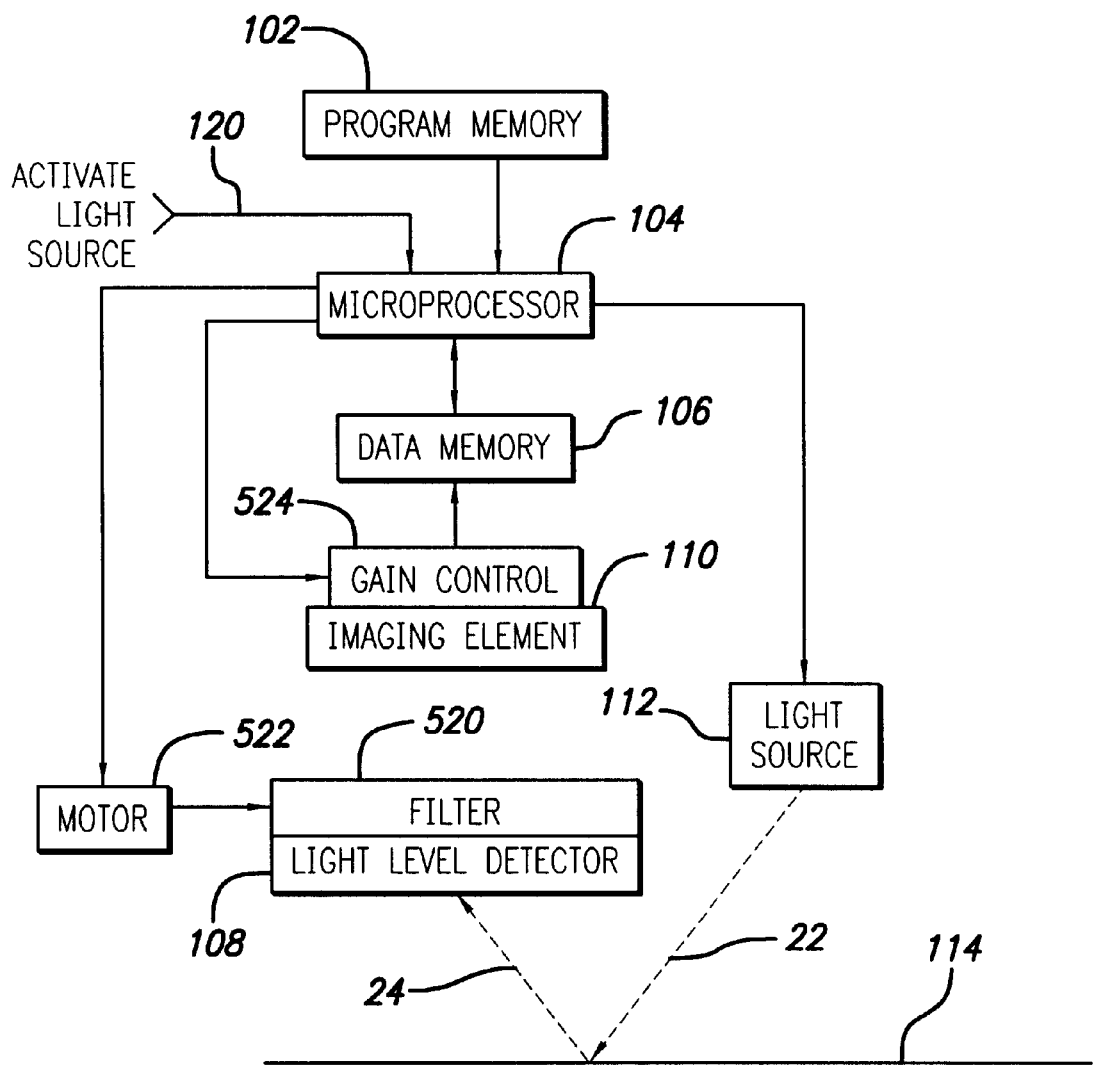
FIG. 5 illustrates an alternative embodiment of the imaging system.

An alternative embodiment of the imaging system will now be explained with reference to FIG. 5. As will be explained in more detail below, the alternative embodiment is capable of reading printed bar codes using diffuse light and etched bar codes using specular light. The alternative embodiment illustrated in FIG. 5 includes a program memory 102, microprocessor 104, data memory 106, light source 112, and imaging element 110 that are similar to like elements described above in connection with FIG. 3.

A filter 520 is also included to filter the light reflected onto the imaging element 110. For example, the specular light may be predominantly polarized in a particular orientation, while the diffuse light may be substantially non-polarized. A conventional polarized filter would then be capable of removing the specular light and permitting the diffuse light to transmit therethrough. The filter 520 blocks specular light, allowing only diffuse light to pass. The filter 520 is movable by a motor 522, which moves the filter from a position directly in front of the imaging element 110 to a position away from the imaging element. Thus, when the filter 520 is positioned directly in front of the imaging element 110, only diffuse light reaches the imaging element. On the other hand, when the filter 520 is positioned away from the imaging element 110, specular light can reach the imaging element. The filter includes a light level detector 108 that operates similarly to the light level detector described above in connection with FIG. 3.

A gain control 524 for controlling the output level of electrical signals produced by the imaging element 110 is also included. As will be explained in more detail below, the gain control 524 is set at a relatively high level while the light level detector 108 detects only diffuse light, but is set at a lower level when the light level detector detects specular light. This is necessary because, as explained above, the intensity level of diffuse light is significantly less than the intensity level of specular light. Consequently, the levels of the electrical signals produced by the imaging element 110 in response to diffuse light are significantly lower than the levels of the electrical signals produced in response to specular light.

Figure 6:
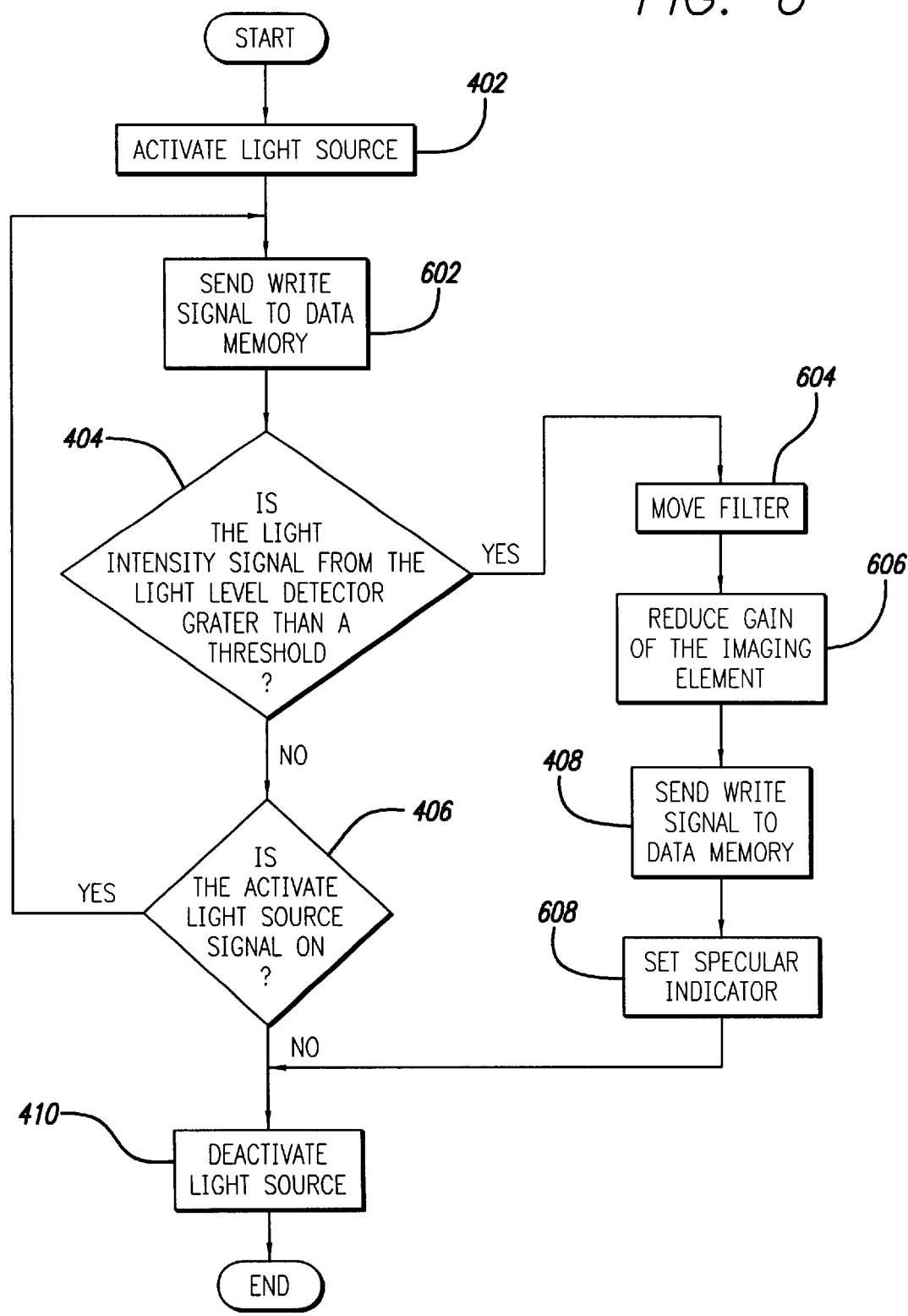
FIG. 6 illustrates an exemplary process for controlling operation of the embodiment illustrated in FIG. 5.

An exemplary program for controlling operation of the alternative embodiment illustrated in FIG. 5 will now be described with reference to FIG. 6. The process illustrated in FIG. 6 is similar to the process illustrated in FIG. 4 with the following differences. The process illustrated in FIG. 6 includes step 602 for storing image data produced by the imaging element 110 from diffuse light. Also, when it is determined at step 404 that the light level detector 108 is detecting specular light, the process illustrated in FIG. 6 moves the filter 520 away from the imaging element 110 at step 604 so that the specular light hits the imaging element. The process also reduces the gain of the electronic signals produced by the imaging element 110 at step 606. The process then causes the image data produced by the imaging element 110 in response to the specular light to overwrite image data previously stored in the data memory 106 at step 408. An indicator is set at step 608 indicating that image data stored in the data memory 106 was produced from specular light.

It should be noted that image data produced from specular light will be inverse with respect to image data produced from diffuse light. That is, a dark element in an image produced from diffuse light would appear light in an image produced from specular light, and likewise a light element in an image produced from diffuse light would appear dark in an image produced from specular light. The indicator set at step 608, which indicates that the image data stored in the image memory 106 was produced from specular light, can be utilized in decoding the image data. Numerous suitable methods for decoding image data are known to those skilled in the art and any such method may be utilized with the present invention.

Figure 7:
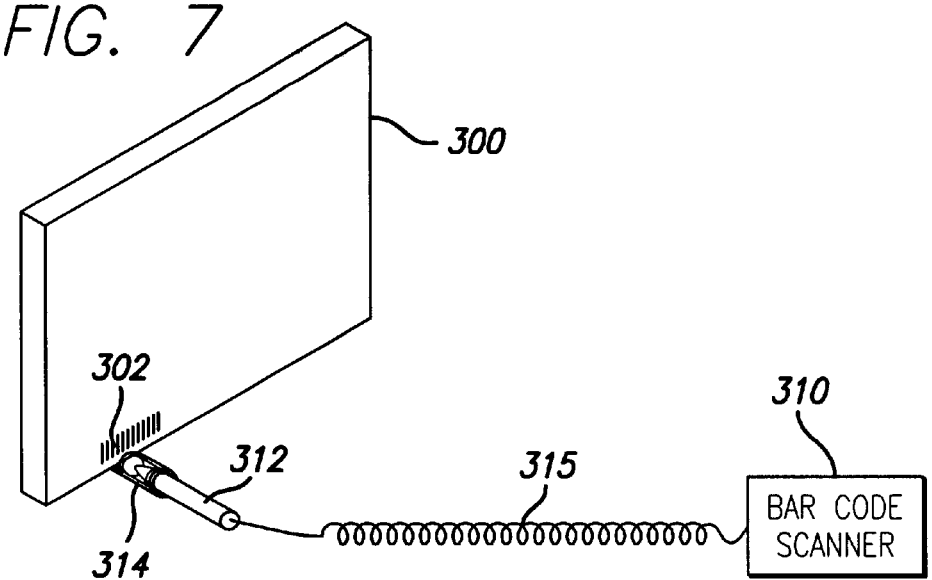
FIG. 7 illustrates an embodiment of the imaging system adapted for use with symbols printed onto silicon wafers.
Figure 8:
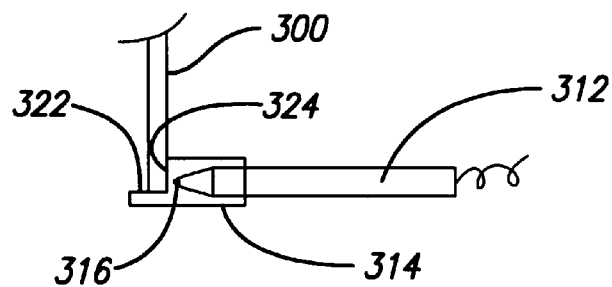
FIG. 8 illustrates a side view of a light wand used in the imaging system of FIG. 7.
Figure 9:
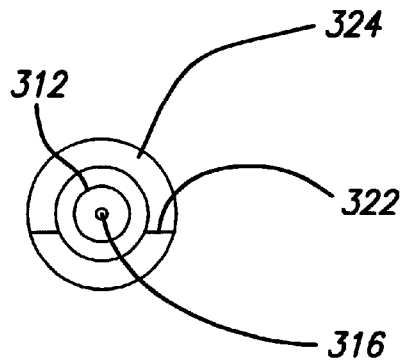
FIG. 9 illustrates an end view of the light wand of FIG. 8.

Referring now to FIGS. 7–9, an embodiment of the present imaging system adapted for use in reading low contrast symbols is illustrated. A substrate 300, such as a silicon wafer, includes a bar code symbol 302 formed thereon by known processes, such as by etching, photolithography or machining. The bar code symbol 302 is disposed close to an edge of the substrate. As shown in FIG. 7, the bar code symbol 302 comprises a one-dimensional bar code symbol, though it should be appreciated that two-dimensional bar code symbols can also be advantageously utilized. It should also be appreciated that use of the present imaging system would not be limited to symbols disposed on silicon wafers, but would be applicable to a variety of different structures having low contrast symbols disposed thereon, such as metallic or shiny surfaces.

The imaging system comprises a light wand 312 coupled to a scanner unit 310 through an electrical cable 315. The light wand 312 comprises a cylindrical housing that encloses both the light source 112 and imaging element 110 of the imaging system 100 described above with respect to FIG. 2. A common lens 316 is shared by both the light source 112 and the imaging element 110, such that light transmitted by the light source 112 passes through the common lens, and light reflected back to the light wand 312 passes through the common lens to the imaging element 110. The common lens 316 is disposed at a distal end of the light wand 312 and is axially symmetric with the cylindrical housing of the light wand. The remaining elements of the imaging system, including the microprocessor 104, the program memory 102 and the data memory 106 are disposed in the scanner unit 310, which communicate with the light source 112 and the imaging element 110 in the light wand 312 by electrical signals passing through the cable 315. Instead of the cable 315, it should be appreciated that other known methods for communication between the light wand 312 and the scanner unit 310 may also be utilized, such as wireless RF communication or infrared light.

As generally known in the art, a light wand is most effective at reading conventional bar code symbols by disposing the light wand at an angle (such as 45°) between the plane of the media surface on which the bar code symbol is disposed and the perpendicular to the plane. This is because conventional light wands are adapted to receive diffuse light reflected from the media surface, for the reasons described above. By disposing the light wand closer to perpendicular to the plane, such as illustrated in FIG. 3C, specular light is reflected back to the imaging element. The present embodiment of the invention seeks to encourage, rather than discourage, the collection of specular light reflected from a low contrast bar code symbol.

More particularly, the light wand 312 effectively reads low contrast bar code symbols, such as the symbol 302 printed onto a silicon wafer 300, using specular light by controlling the angle at which the light wand is oriented with respect to the surface of the wafer. As described above, the specular light received by the imaging element of the light wand 312 will be used to generate a reverse image of the low contrast bar code symbol, which may thereafter be decoded using conventional processes. Alternatively, the low contrast bar code symbols may be created in an inverse fashion, whereby the bars are marked and the spaces are left unmarked, allowing the spaces to produce a larger signal than the bars when viewed using specular reflection. Symbols created in this fashion can be decoded utilizing standard procedures. Effective operation of a light wand in receiving specular light reflection has been found by maintaining the light wand at an angle ranging from approximately 3–7° from the perpendicular. It should be appreciated that commercial embodiments of the light wand may have slight variations of this optimum angle that may be easily determined by one of ordinary skill in the art by consideration of the foregoing discussion.

To further aid in improving the proficiency of operators to properly use the light wand 312, an alignment tip 314 is included. The alignment tip 314 comprises a cylindrical sleeve having a hemispherical notch removed. The sleeve has an inside diameter sized to snugly engage over the housing of the light wand 312, with a distal end of the alignment tip 314 extending slightly past the lens 316 of the light wand. The hemispherical notch provides a first surface 322 and a second surface 324 that are normal to each other. The first surface 322 extends roughly parallel to a central axis of the light wand 312 housing and along a diameter of the light wand housing. The second surface 324 extends roughly perpendicular to the central axis of the light wand 312. The actual angles of the first and second surfaces 322, 324 are determined by the optimum angle for the light wand 312 to receive specular light, as discussed above.

To operate the light wand 312 with the alignment tip 314, the light wand is brought into proximity with the wafer 300 such that the first surface 322 engages an edge of the wafer and the second surface 324 engages the surface of the wafer on which the bar code is disposed. The orientation of the first and second surfaces 322, 324 are selected such that the light wand 312 is in an optimum position for received specular light when the first and second surfaces are flush to the edge and surface of the wafer, respectively. The lens 316 terminates slightly below the second surface 324 (as shown in FIG. 8), so that the lens does not come into contact with the surface of the wafer. The light wand 312 is moved laterally by the user with the first surface 322 sliding along the edge of the wafer and the lens 316 passing over the entire bar code symbol 302. After an operator becomes accustomed to the appropriate angle to hold the light wand 312 with respect to the wafer 300, it may be possible for the operator to remove the alignment tip 314. To prevent harm to the silicon wafer 300 by contact with the alignment tip 314, the alignment tip may be comprised of a non-abrasive material, such as Delrin or Teflon.

Having thus described several alternative embodiments of the present invention, it should be apparent to those skilled in the art that certain advantages have been achieved. It should also be appreciated that various modifications, adaptations, and alternative embodiments thereof may be made within the scope and spirit of the present invention. For example, although the embodiments of the present invention described above include a light level detector 108 and the automatic generation of a write control signal (not shown) to the data memory 106, a simplified embodiment of the present invention could be constructed by eliminating the light level detector 108 and replacing the automatically activated write signal with a manually activated write signal. In such an embodiment, the user would manually activate the write control signal to the data memory 106 when the imaging system 100 is positioned with respect to the target 114 so as to receive specular light 24 reflected off of the target as illustrated in FIG. 3c. The invention is limited only by the following claims.

What is claimed is:

1. An apparatus for reading a low contrast symbol on a target, comprising:
    a wand;
    a light source disposed in said wand and positioned to illuminate the target when the wand is positioned in proximity to the target, whereby light from said light source is reflected from the target as specular light concentrated along a path;
    an imaging element disposed in said wand and positioned to receive the specular light when said wand is in a predetermined orientation with respect to the target; and
    means for determining whether an amount of light received by said imaging element exceeds a predetermined threshold indicative of receiving the specular light;
    wherein said imaging element is adapted to provide a data signal from the specular light when said predetermined threshold is exceeded, whereby data from the low contrast symbol is encoded in the data signal when the low contrast symbol is illuminated by said light source and said wand is in the predetermined orientation.

2. The apparatus of claim 1, further comprising a processor coupled to said wand for processing image data of the low contrast symbol from the specular light.

3. The apparatus of claim 2, wherein said processor further comprises:
    a memory; and
    means for causing said image data created by said imaging means to be stored in said memory if said threshold determining means determines that said amount of light received by said imaging element exceeds said predetermined threshold.

4. The apparatus of claim 3, further comprising light amount determining means for determining said amount of light received by said imaging element.

5. The apparatus of claim 4, wherein said threshold determining means comprises program code for instructing a processor to compare said amount of light determined by said light amount determining means with said predetermined threshold.

6. The apparatus of claim 5, wherein said means for causing said image data to be stored in said memory comprises program code for instructing said processor to output a write signal to said memory if said comparison indicates that said amount of light determined by said light amount determining means exceeds said predetermined threshold.

7. The apparatus of claim 1, further comprising means for maintaining said wand in the predetermined orientation.

8. The apparatus of claim 7, wherein said orientation maintaining means further comprises an alignment tip coupled to a distal end portion of said wand, said alignment tip comprising a notched portion adapted to engage an edge of a substrate.

9. A method for imaging a low contrast symbol disposed on a substrate utilizing a light wand comprising a light source and an imaging element, said method comprising:
    directing source light from said light source of said light wand onto said symbol, said source light reflecting off of said low contrast symbol as reflected light, said reflected light comprising a specular portion concentrated along a path;
    orienting said light wand with respect to said substrate so that said imaging element receives light comprising predominantly said specular portion of said reflected light;
    moving said light wand across said symbol;
    determining whether an amount of said light received by said imaging element exceeds a predetermined threshold indicative of specular light; and
    decoding data of said symbol from said specular portion of said light received by said imaging element.

10. The method of claim 9, further comprising the step of maintaining said light wand in a proper orientation with respect to said substrate.

11. The method of claim 9, further comprising the step of forming said low contrast symbol using a polarity opposite a corresponding polarity of diffuse light reflective symbols.

12. An apparatus for reading low contrast symbols disposed on a substrate, comprising:
    a light source positioned to illuminate a low contrast symbol, whereby light from the light source is reflected from the low contrast symbol as specular light concentrated along a path;
    an imaging element for receiving light reflected from said low contrast symbol, positioned to receive the specular light when said apparatus is in a predetermined orientation with respect to the low contrast symbol; and
    a processor coupled to said imaging element for determining whether an amount of said light received by said imaging element exceeds a predetermined threshold indicative of receiving the specular light, whereby data from the low contrast symbol is encoded by said imaging element from the specular light when the low contrast symbol is illuminated by said light source and said apparatus is in the predetermined orientation.

13. The apparatus of claim 12, further comprising a wand adapted for manipulation by an operator, said wand further comprising said light source and said imaging element.

14. The apparatus of claim 12, further comprising means for maintaining said wand in the predetermined orientation.

15. The apparatus of claim 14, wherein said orientation maintaining means further comprises an alignment tip coupled to a distal end portion of said wand, said alignment tip comprising a notched portion adapted to engage an edge of a substrate.

16. The apparatus of claim 12, further comprising a processor coupled to said imaging element for discriminating between the specular light and diffuse light reflected from the low contrast symbol and to process image data of the low contrast symbol from the specular light.

* * * * *